Patented Apr. 4, 1944

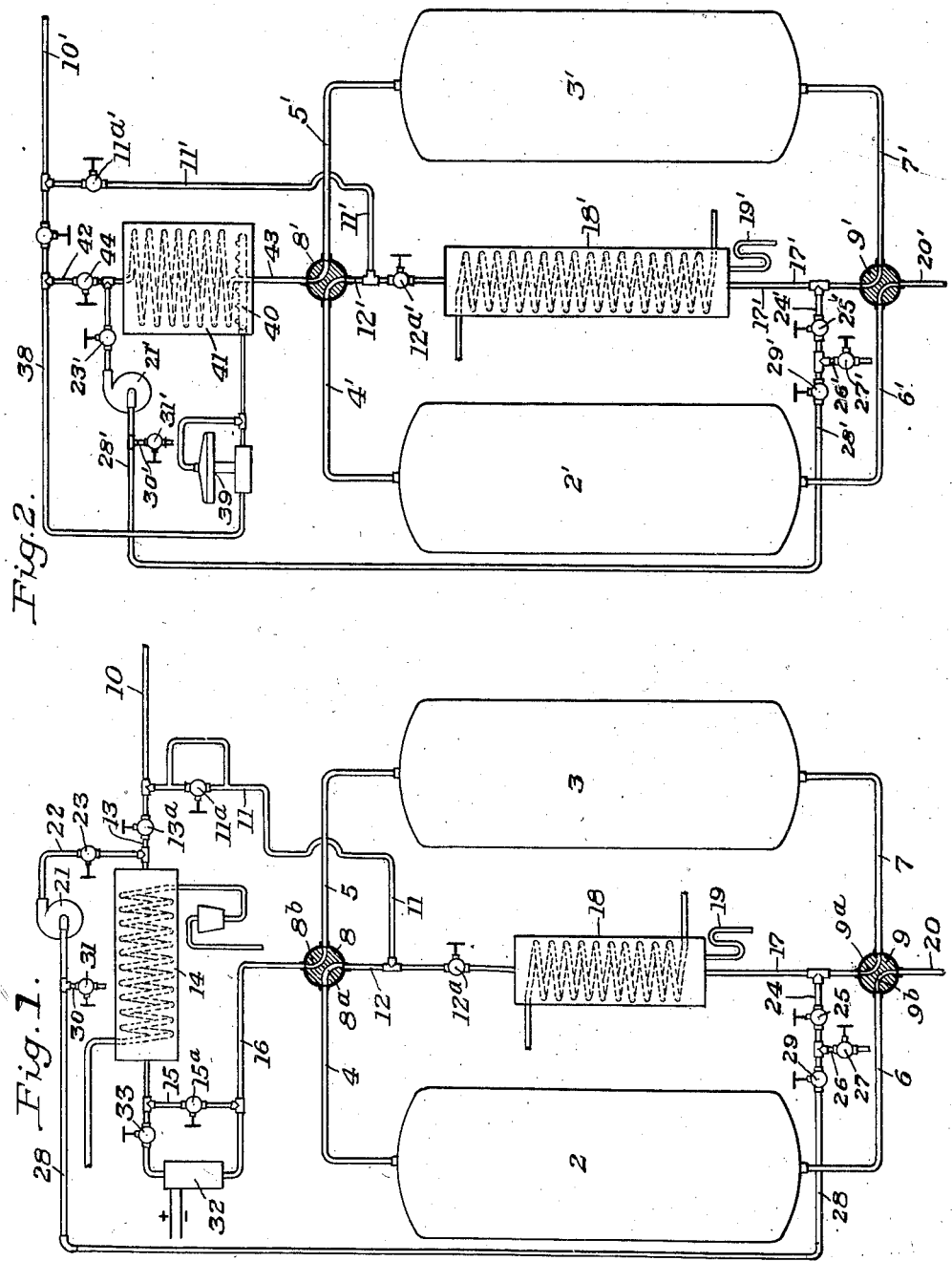

2,345,774

UNITED STATES PATENT OFFICE 2,345,774

METHOD AND APPARATUS FOR THE TREATMENT OF GASES

George L. Simpson, Coraopolis Heights, Pa., assignor to Delaware Engineering Corporation, Wilmington, Del., a corporation of Delaware Application August 23, 1940, Serial No. 353,825

4 Claims. (Cl. 183—4.7)

This invention relates to the treatment of gases containing oxidizable materials. The invention is particularly applicable to and will be described in connection with the treatment of hydrocarbon gases, as for example natural gas, and has to do more particularly with the operation of the adsorbing equipment through which the gas is circulated as a part of the treatment.

Purely as an illustration of the application of my invention, it will be described as applied to natural gas which contains a certain amount of organic material or higher hydrocarbons as well as water vapor. If the gas has been subjected to an absorption process for the extraction of natural gasoline, some of the absorbent oil may be entrained with the gas which also may contain some unremoved higher hydrocarbons. It is the practice to pass the natural gas through adsorbing means which remove the water vapor from the gas and which also remove some of the lighter hydrocarbons, absorbent oil and organic substances. One form of equipment used and to which my invention relates embodies a pair of units, each charged with a finely divided solid absorbent material such as activated alumina or silica gel. The gas is passed alternately through one unit and then the other and while one unit is on adsorption, the other is being reactivated. The organic materials referred to in the gas, upon being adsorbed by the solid material, substantially reduce the property of the material to adsorb water vapor from the gas, and this reduces the production output of the system. This invention involves the procedure for revivifying an adsorbent that has become foul with hydrocarbons and a method of conducting this clean-up at periodic intervals to prevent the accumulation beyond some desirable value while the usual methods of reactivation under pressure and in a heated gas stream are conducted between periodic cleanings.

The higher temperatures for this periodic clean-up may be obtained by burning gas in a stream of air and sucking the heated products of reactivation through the adsorbers; in this case, on account of the fire hazard, a complete system of safety screens, safety pilots, automatic pilot lights and maximum temperature shut-off must be provided. In other cases steam, superheated, may be used to heat the stream of air which is drawn through the apparatus. In other cases air, preheated by the regular steam gas heater, may be further heated by an auxiliary electric heater following this heater; or, to avoid the passage of highly heated gases through the valves the additional temperature may be added by electric heaters located inside the adsorber vessels.

In other cases the oxidation of these organic residues in place by use of a controlled stream of heated air, may be used. Because excessive temperatures can be readily developed if the oxidation (an exothermic reaction) is carried on at too rapid a rate, automatic means may be provided for returning a controllable portion of the effluent gases to the input side to regulate the rate of oxidation through dilution and the control of the oxygen content of the heated input reactivating stream.

I contemplate reactivating under working pressure and by means of passing a heated portion of the gas to be cleaned at regular intervals through the unit to be reactivated, but when the efficiency of the adsorbent material is undesirably reduced, I bleed the pressure from the unit and clean it by a highly heated current of air.

According to the invention a method and apparatus are provided wherein the unit on activation may be reduced to atmospheric pressure at desired intervals and air at elevated temperature forced through the adsorbent material to oxidize or carry away the deposited organic material and thereby clean the material to render it adsorptive to water.

The invention may be fully understood by reference to the accompanying drawing in which:

Fig. 1 is a diagrammatic view of one form of my invention, arranged primarily for use where the entering gas is relatively cool and wet;

Fig. 2 is a modification showing a different form of heating apparatus, and showing a system primarily intended for use of fuel fired heated gas reactivation.

Referring first to Fig. 1, the numerals 2 and 3 designate similar adsorptive units of a type well known to those skilled in the art, and adapted to contain a mass of finely divided solid adsorbing material, such, for example, as activated alumina or silica gel. Each of the units 2 and 3 is provided with a gas inlet pipe, these being designated 4 and 5 respectively. They are each provided with an outlet pipe, the outlet pipes being designated 6 and 7 respectively. The inlet pipes 4 and 5 both communicate with the common switchover valve 8, and the pipes 6 and 7 both communicate with the similar valve 9. The gas to be treated is supplied through a pipe or conduit 10. Branching off from the pipe 10 is a main pipe 11, the flow through which is controlled by valve 11a. The pipe 11 connects into a pipe 12 which in turn leads to one side of the valve 8. The arrangement is such that with the valve in the position shown in Fig. 1 a gas flowing through the pipe 10 may pass down the pipe 11, enter the pipe 12, pass through the valve 8 into the pipe 4, and thus enter the unit 2. The unit 2 at this time is on the adsorptive cycle of its operation. By turning the valve 8 a quarter turn, the passage 8a in the valve 8 may be connected to deliver fluid from the pipe 12 to the pipe 5, thus putting the unit 3 on the adsorbing stage.

The pipe 10 is provided with a valve-controlled branch 13 that passes through a heat exchanger 14, and through a valve passageway 15 into pipe 16 that communicates with the valve 8. Valves 13a and 15a control the flow of fluid through this part of the system. When the unit 2 is on the adsorbing stage, the heated gas from the pipe 16 flows through port 8b of the valve 8 into pipe 5 and into the adsorbing unit 3. From the adsorbing unit 3 it flows through the pipe 7 to the passage 9a of the valve 9 into a pipe 17 thence to a heat exchanger 18. The heat exchanger 18 is for cooling the gas. The cooled gases are discharged into the pipe 12, there being a valve 12a in this pipe between the cooler 18 and the junction of pipes 11 and 12. A trap 19 is provided at the bottom of the heat exchanger or cooler 18 to carry off any material which condenses therein.

With this arrangement most of the gas flowing through the pipe 10 is delivered directly to the adsorbing chamber or unit 2. A small portion of the flow of gas, however, is by-passed through the heat exchanger 14 where the gas is heated by means of a steam coil, and from the heat exchanger it flows through the chamber or unit 3 where the heated gas serves to reactivate the adsorbent material. After having been used as a reactivating fluid, it passes through pipe 7, valve 9, and pipe 17 into the cooler 18. The cooled gas is returned to the main stream of gas in pipe 12 for passage through the adsorber 2. From the adsorber 2 the dry gas passes out the pipe 6 and through passage 9b of valve 9 to a discharge pipe 20. By reversing the valves 8 and 9 the flow of fluid is reversed so that most of the gas flows only through the unit 3, whereas the lesser flow of heated gas then flows through the unit 2 to activate the material therein.

During this treatment of the gas the adsorbent material in the adsorbing unit becomes fouled with the organic accumulations above referred to. And when it becomes so fouled, its ability to adsorb water from the gas is reduced. According to the present invention means are provided in the system whereby at any time either of the units which is not on the adsorbing cycle may be reduced to atmospheric pressure, and highly heated air can be forced through it to oxidize and carry away these deposited hydrocarbons. To this end there is provided a blower 21 having an outlet pipe 22 connected into the pipe 13. A valve 23 is provided in pipe 22. A branch pipe 24 leads off the pipe 17. The pipe 24 is provided with a valve 25 and is connected to a vent pipe 26 in which is a valve 27 for controlling the escape of gas to the atmosphere. It is connected also with a branch pipe 28 having a valve 29 therein, leading to the intake side of the blower 21. The pipe 28 is also provided with an air intake pipe 30, having a valve 31 therein through which atmospheric air may be inducted into the system.

The operation is as follows: Assume that the parts are in the position shown in Fig. 1 and that it is desired to remove the accumulation from the unit 3 which is at this time on the activating cycle. The valve 13a is closed. The valve 15a is closed. The valve 12a is closed, and the valve 25 is opened, and the valve 27 is opened. This vents the unit 3 to the atmosphere. The blower 21 is then operated with the valve 23 and valve 31 opened. Air is blown through the heat exchanger 14, and is heated. It may be additionally heated by being passed through an auxiliary heater 32, which may conveniently be an electric heater, so that the temperature of the air can be raised above that produced by the steam coil in the heat exchanger 14. A valve 33 controls the flow of air through this auxiliary heater. When the air is to be passed through the heater 32 the valve 33 is opened and the valve 15a is closed. The highly heated air is then discharged from the heater 14 through pipe 16, valve 8, pipe 5, and into the unit 3 where it will oxidize the material which has accumulated in the filtering material, and carry away some of the other impurities. The products of combustion are vented to the atmosphere through the valve-controlled vent-pipe 26. In order to prevent excessively high temperatures during the oxidation of the combustibles, the valve 29 may be opened so that the pipe 28 may lead some of the products of combustion to the blower 21. The rate of combustion and the temperature can be regulated by controlling the dilution of the air with products of combustion. Hand valves have been illustrated for accomplishing this control, but it will be apparent that automatic regulators may be employed. After the heated air has been passed through the unit 3 for sufficient length of time to remove the accumulation of organic material from the solid adsorbent, blower 21 is cut off, valve 23 is closed, valve 25 is closed, valve 12a is opened, valve 15a is opened, valve 33 is closed, and the normal flow of the gas through the unit 3 is re-established, and by manipulating valves 8 and 9 the flow of gas to be cleaned may be established through unit 3 if desired. It is, of course, apparent that with the valves 8 and 9 reversed the unit 2 may be treated in the same way.

In the system shown in Fig. 2 substantially the same arrangement is employed, and corresponding reference numerals with primes affixed have been used to designate corresponding parts. The main flow of gas is from the pipe 10' through valve 11a', pipe 11' to pipe 12', valve 8', pipe 4' to unit 2'. From cooler 18' the gases are discharged through the pipe 12' having a valve 12a' therein, the pipe 12' communicating with the valve 8'. Instead of using a steam coil to preheat the gas that is used for activating the adsorbent material, Fig. 2 shows an arrangement in which some of the gas is by-passed through a pipe 38 and a pressure regulator 39 to a burner 40. The burner 40 provides heat for a heat exchanger 41. That portion of gas which is used for activating purposes flows through pipe 42 and heat exchanger 41. It is discharged from the heat exchanger 41 through pipe 43 to the valve 8'. A valve 44 regulates the amount of gas that is sent through the heat exchanger. The blower 21' is connected through the valve 23' to the pipe 42 on the inlet side of the heat exchanger. And the arrangement is such that when the valve 44 is closed and the valves 23' and 31' are opened and the vent valves 25' and 27' are opened, diluted air may be forced through the system instead of gas. When air diluted or undiluted is forced through the system the gas burner can be set to deliver more heat, and raise the temperature of the air to a higher point than when it is being used to heat the gas. The operation is otherwise the same as described in connection with Fig. 1.

In the operation of the processing the gas is usually heated only to about 340° F. The air on the other hand should be heated to a temperature in excess of 500° F. and not in excess of 900° F., although a temperature considerably lower than 500° F. could be employed if a longer time for oxidation should be adopted.

It will be seen that the invention provides a convenient method and apparatus for the periodic removal of accumulated hydrocarbons from the adsorbent material without requiring the removal of the adsorbent material from the adsorbing units 2 and 3 and without shutting down the operation of the system. While I have illustrated and described certain preferred embodiments of my invention, and have described the same particularly in connection with the treatment of natural gas, it will be understood that this is merely by way of illustration, and that various changes and modifications may be in the contemplation of my invention and under the scope of the following claims, and that the invention is applicable to the treatment of any gases where the solid adsorbent material tends to become clogged with an oxidizable deposit or accumulation.

I claim as my invention:

1. Apparatus for the treatment of hydrocarbon gases comprising a pair of treating units containing a solid adsorptive material, a source of gas to be treated, valves for circulating gas from said source through one unit which is conditioned as an adsorber while the other unit is being activated and for alternating the flow to reverse the conditions of adsorbing and activation, means for by-passing some of the gas from said source and directing it into the unit which is being activated, means for heating the gas so by-passed before it enters the unit, means for delivering the gas after it passes through the unit under activation to the main stream of gas to pass through the adsorbing unit, means for cooling the gas so by-passed before it enters the adsorbing unit, means for selectively interrupting the flow of the by-passed gas stream into the heating means, means for selectively circulating air in lieu of the by-passed gas stream into the said heater and unit, and means for diverting the air after it flows through the unit to prevent contamination of the gas in the other unit.

2. Apparatus for the treatment of hydrocarbon gases under pressure, comprising a pair of treating units containing a solid adsorptive material, a source of gas to be treated, valves for circulating gas from said source through one unit which is conditioned as an adsorber while the other unit is being activated and for alternating the flow to reverse the conditions of adsorbing and activation, means for by-passing some of the gas from said source and directing it into the unit which is being activated, means for heating the gas so by-passed before it enters the unit, means for delivering the gas after it passes through the unit under activation to the main stream of gas under pressure to pass through the adsorbing unit, means for closing said by-pass, means for venting to the atmosphere the unit under activation, while the other unit is on adsorption, means for forcing air through the vented unit, means for diluting the air with products of combustion from the unit being activated, and means for heating the air to a temperature to oxidize organic deposits on the adsorptive material.

3. Apparatus of the class described, comprising two chambers containing adsorbent material, a switchover valve, two pipes leading from the valve one to each chamber, a conduit through which gases to be treated are supplied, a main pipe and a branch pipe leading from the conduit, to the switchover valve by means of which valve either of the two last mentioned pipes can be connected to either one of the chambers, heating means connected to the branch pipe, an outlet pipe leading from each chamber, a discharge pipe, a second switchover valve connected to the outlet pipes and the discharge pipe, means for cooling gas, said cooling means having a gas inlet and a gas outlet, a pipe connecting the gas inlet to the second switchover valve, a pipe connecting the gas outlet to the main pipe, means whereby air may be forced through the branch pipe, said last mentioned means being connected to the branch pipe before the pipe enters the heater, and means connected to the pipe connecting the gas inlet and the second switchover valve for diluting the air with gases which are produced from air which has already been passed through one of the chambers.

4. The method of treating combustible gas to purify it which comprises dividing the flow of gas to be treated, alternately diverting one stream through one of two adsorber units and then through the other, heating the other stream and flowing it successively through both adsorber units, first through the one not receiving the first stream of gas and second through the one through which the first stream is flowing and in the same direction so that the two streams mingle in the second unit, intermittently controllably diluting the second stream of gas with air and when so diluted circulating it through only the first unit which it contacts whereby it does not mingle with the second stream when so diluted.

GEORGE L. SIMPSON.